United States Patent
Ding et al.

(10) Patent No.: US 10,898,885 B2
(45) Date of Patent: Jan. 26, 2021

(54) NANO-SIZED ZEOLITE SUPPORTED CATALYSTS AND METHODS FOR THEIR PRODUCTION

(71) Applicant: Saudi Arabian Oil Company, Dhahran (SA)

(72) Inventors: Lianhui Ding, Dhahran Camp (SA); Essam Al-Sayed, Al-Khobar (SA); Manal Al-Eid, Saihat (SA); Hanaa Habboubi, Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/789,879

(22) Filed: Feb. 13, 2020

(65) Prior Publication Data

US 2020/0179912 A1 Jun. 11, 2020

Related U.S. Application Data

(62) Division of application No. 15/480,917, filed on Apr. 6, 2017, now Pat. No. 10,603,657.

(Continued)

(51) Int. Cl.

| | | |
|---|---|---|
| *B01J 29/06* | (2006.01) | |
| *B01J 29/78* | (2006.01) | |
| *B01J 35/02* | (2006.01) | |
| *C10G 45/08* | (2006.01) | |
| *C10G 45/12* | (2006.01) | |
| *C10G 47/20* | (2006.01) | |
| *B01J 29/072* | (2006.01) | |
| *B01J 37/20* | (2006.01) | |
| *B01J 35/10* | (2006.01) | |
| *B01J 29/076* | (2006.01) | |
| *B01J 35/00* | (2006.01) | |
| *B01J 29/76* | (2006.01) | |
| *B01J 29/26* | (2006.01) | |
| *B01J 29/10* | (2006.01) | |
| *B01J 29/24* | (2006.01) | |
| *B01J 29/48* | (2006.01) | |
| *B01J 29/16* | (2006.01) | |
| *B01J 29/46* | (2006.01) | |
| *B01J 37/02* | (2006.01) | |
| *B01J 37/10* | (2006.01) | |
| *B01J 21/04* | (2006.01) | |
| *B01J 23/28* | (2006.01) | |
| *B01J 23/30* | (2006.01) | |
| *B01J 23/75* | (2006.01) | |
| *B01J 23/755* | (2006.01) | |

(52) U.S. Cl.
CPC ............ *B01J 29/061* (2013.01); *B01J 21/04* (2013.01); *B01J 23/28* (2013.01); *B01J 23/30* (2013.01); *B01J 23/75* (2013.01); *B01J 23/755* (2013.01); *B01J 29/072* (2013.01); *B01J 29/076* (2013.01); *B01J 29/106* (2013.01); *B01J 29/166* (2013.01); *B01J 29/24* (2013.01); *B01J 29/26* (2013.01); *B01J 29/46* (2013.01); *B01J 29/48* (2013.01); *B01J 29/7607* (2013.01); *B01J 29/7615* (2013.01); *B01J 29/7807* (2013.01); *B01J 29/7815* (2013.01); *B01J 35/0013* (2013.01); *B01J 35/023* (2013.01); *B01J 35/1038* (2013.01); *B01J 35/1042* (2013.01); *B01J 37/0201* (2013.01); *B01J 37/0207* (2013.01); *B01J 37/10* (2013.01); *B01J 37/20* (2013.01); *C10G 45/08* (2013.01); *C10G 45/12* (2013.01); *C10G 47/20* (2013.01); *B01J 2229/20* (2013.01); *B01J 2229/36* (2013.01); *B01J 2229/42* (2013.01)

(58) Field of Classification Search
CPC ...... B01J 29/061; B01J 29/072; B01J 29/076; B01J 29/106; B01J 29/166; B01J 29/24; B01J 29/26; B01J 29/46; B01J 29/48; B01J 29/7607; B01J 29/7807; B01J 29/7615; B01J 29/7815; B01J 2229/20; B01J 2229/36; B01J 2229/42; B01J 35/0013; B01J 35/023; B01J 35/1038; B01J 35/1042; B01J 37/0201; B01J 37/0207; B01J 37/10
USPC ........................... 502/63, 64, 69, 70, 71, 60
See application file for complete search history.

(56) References Cited

U.S. PATENT DOCUMENTS

| | | |
|---|---|---|
| 2,358,150 A | 9/1944 | Cooke |
| 3,607,725 A | 9/1971 | Irvine et al. |

(Continued)

FOREIGN PATENT DOCUMENTS

| | | |
|---|---|---|
| EP | 0197289 A2 | 10/1986 |
| EP | 1600491 A1 | 11/2005 |

(Continued)

OTHER PUBLICATIONS

Pural Catapal High-purity alumina hydrates information sheet, SASOL Performance Chemicals, pp. 1-16, no date available.*

(Continued)

*Primary Examiner* — Elizabeth D Wood
(74) *Attorney, Agent, or Firm* — Dinsmore & Shohl LLP

(57) ABSTRACT

According to one or more embodiments described, a zeolite supported catalyst may be synthesized by a process that includes combining a colloidal mixture with a metal oxide support material to form a support precursor material, processing the support precursor material to form a support material, and impregnating the support material with one or more metals to form the zeolite supported catalyst. The colloidal mixture may include nano-sized zeolite crystals, and the nano-sized zeolite crystals may have an average size of less than 100 nm.

8 Claims, 1 Drawing Sheet

Related U.S. Application Data

(60) Provisional application No. 62/320,938, filed on Apr. 11, 2016.

(56) References Cited

U.S. PATENT DOCUMENTS

| | | |
|---|---|---|
| 3,617,493 A | 11/1971 | Wirth et al. |
| 3,730,879 A | 5/1973 | Christman et al. |
| 3,755,143 A | 8/1973 | Hosoi et al. |
| 3,830,720 A | 8/1974 | Misaki et al. |
| 3,856,659 A | 12/1974 | Owen |
| 3,862,838 A | 1/1975 | Sloboda |
| 3,862,898 A | 1/1975 | Boyd et al. |
| 3,876,523 A | 4/1975 | Rosinski |
| 4,016,067 A | 4/1977 | Fischer et al. |
| 4,133,777 A | 1/1979 | Frayer et al. |
| 4,134,824 A | 1/1979 | Kamm et al. |
| 4,153,539 A | 5/1979 | Herrington et al. |
| 4,264,435 A | 4/1981 | Read et al. |
| 4,297,203 A | 10/1981 | Ford et al. |
| 4,436,706 A | 3/1984 | Nacken et al. |
| 4,527,003 A | 7/1985 | Okamoto et al. |
| 4,587,011 A | 5/1986 | Okamoto et al. |
| 4,655,904 A | 4/1987 | Okamoto et al. |
| 4,725,349 A | 2/1988 | Okamoto et al. |
| 4,830,728 A | 5/1989 | Herbst et al. |
| 4,832,823 A | 5/1989 | Goyal et al. |
| 4,992,160 A | 2/1991 | Long et al. |
| 5,009,768 A | 4/1991 | Galiasso et al. |
| 5,019,240 A | 5/1991 | Best et al. |
| 5,171,331 A | 12/1992 | Debras et al. |
| 5,233,121 A | 8/1993 | Modica |
| 5,435,907 A | 7/1995 | Sudhakar et al. |
| 5,523,502 A | 6/1996 | Rubin |
| 5,603,824 A | 2/1997 | Kyan et al. |
| 5,871,650 A | 2/1999 | Lai et al. |
| 5,904,837 A | 5/1999 | Fujiyama |
| 5,906,728 A | 5/1999 | Iaccino et al. |
| 5,951,850 A | 9/1999 | Ino et al. |
| 5,954,947 A | 9/1999 | Mignard et al. |
| 5,958,365 A | 9/1999 | Liu |
| 6,033,555 A | 3/2000 | Chen et al. |
| 6,123,830 A | 9/2000 | Gupta et al. |
| 6,190,533 B1 | 2/2001 | Bradow et al. |
| 6,190,538 B1 | 2/2001 | Gosselink et al. |
| 6,210,562 B1 | 4/2001 | Xie et al. |
| 6,316,674 B1 | 11/2001 | Kantam et al. |
| 6,383,975 B1 | 5/2002 | Rocha et al. |
| 6,384,285 B1 | 5/2002 | Choudary et al. |
| 6,656,346 B2 | 12/2003 | Ino et al. |
| 6,743,961 B2 | 6/2004 | Powers |
| 6,811,684 B2 | 11/2004 | Mohr et al. |
| 6,979,757 B2 | 12/2005 | Powers |
| 6,982,074 B2 | 1/2006 | Jan et al. |
| 7,019,187 B2 | 3/2006 | Powers |
| 7,094,333 B2 | 8/2006 | Yang et al. |
| 7,374,664 B2 | 5/2008 | Powers |
| 7,396,449 B2 | 7/2008 | Powers |
| 7,404,889 B1 | 7/2008 | Powers |
| 7,419,584 B2 | 9/2008 | Stell et al. |
| 7,550,642 B2 | 6/2009 | Powers |
| 7,744,747 B2 | 6/2010 | Halsey |
| 7,785,563 B2 | 8/2010 | Ryoo et al. |
| 7,858,834 B2 | 12/2010 | Powers |
| 7,972,498 B2 | 7/2011 | Buchanan et al. |
| 8,658,019 B2 | 2/2014 | Bridges et al. |
| 9,096,806 B2 | 8/2015 | Abba et al. |
| 9,228,139 B2 | 1/2016 | Shafi et al. |
| 9,228,140 B2 | 1/2016 | Abba et al. |
| 9,228,141 B2 | 1/2016 | Sayed et al. |
| 9,255,230 B2 | 2/2016 | Shafi et al. |
| 9,279,088 B2 | 3/2016 | Shafi et al. |
| 9,284,497 B2 | 3/2016 | Bourane et al. |
| 9,284,501 B2 | 3/2016 | Sayed et al. |
| 9,284,502 B2 | 3/2016 | Bourane et al. |
| 9,296,961 B2 | 3/2016 | Shafi et al. |
| 2005/0133405 A1 | 6/2005 | Wellington et al. |
| 2006/0118462 A1 | 6/2006 | Schulze-Trautmann et al. |
| 2006/0207917 A1 | 9/2006 | Domokos et al. |
| 2006/0260981 A1 | 11/2006 | Gosling |
| 2007/0018100 A1 | 1/2007 | Tanaka et al. |
| 2007/0090018 A1 | 4/2007 | Keusenkothen et al. |
| 2007/0108100 A1 | 5/2007 | Satchell, Jr. |
| 2007/0209968 A1 | 9/2007 | Euzen |
| 2008/0277314 A1 | 11/2008 | Halsey |
| 2008/0283445 A1 | 11/2008 | Powers |
| 2009/0050523 A1 | 2/2009 | Halsey |
| 2009/0218255 A1 | 9/2009 | Claude et al. |
| 2009/0272674 A1* | 11/2009 | Zheng ............... B01J 29/7815 208/216 PP |
| 2010/0018904 A1 | 1/2010 | Kressmann et al. |
| 2010/0023023 A1 | 1/2010 | Popovic et al. |
| 2010/0122932 A1 | 5/2010 | Haizmann et al. |
| 2010/0155293 A1 | 6/2010 | Verstraete et al. |
| 2010/0230323 A1 | 9/2010 | Juarez et al. |
| 2011/0083996 A1 | 4/2011 | Shafi et al. |
| 2012/0061294 A1 | 3/2012 | Choi et al. |
| 2012/0237439 A1 | 9/2012 | Rouleau et al. |
| 2012/0279728 A1 | 11/2012 | Northrop et al. |
| 2013/0118954 A1 | 5/2013 | Wu et al. |
| 2013/0197285 A1 | 8/2013 | Shafi et al. |
| 2013/0220884 A1 | 8/2013 | Bourane et al. |
| 2013/0248416 A1 | 9/2013 | Shafi et al. |
| 2013/0248417 A1 | 9/2013 | Sayed et al. |
| 2013/0248419 A1 | 9/2013 | Abba et al. |
| 2013/0292299 A1 | 11/2013 | Koseoglu et al. |
| 2014/0221712 A1 | 8/2014 | Greene et al. |
| 2015/0001130 A1 | 1/2015 | Akhras et al. |
| 2016/0369185 A1 | 12/2016 | Ward et al. |
| 2018/0147567 A1 | 5/2018 | Matsushita et al. |

FOREIGN PATENT DOCUMENTS

| | | |
|---|---|---|
| GB | 978576 A | 12/1964 |
| JP | H06277439 A | 10/1994 |
| WO | 98/39096 A1 | 9/1998 |
| WO | 2015/000842 A1 | 1/2015 |
| WO | 2015000847 A1 | 1/2015 |
| WO | 2015128040 A1 | 9/2015 |
| WO | 2015128041 A1 | 9/2015 |
| WO | 2016059569 A1 | 4/2016 |

OTHER PUBLICATIONS

Ding et al., "LCO hydrotreating with M—Ni and W—Ni and W—Ni supported on nano- and micro-sized zeolite beta", Applied Catalysis A: General, 353, (2009), pp. 17-23.*

Examination Report dated Jan. 29, 2020 which pertains to GCC Patent Application No. 2018/35655 with a filing date of Jul. 17, 2018, 5 pages.

Notice of Allowance dated Feb. 19, 2020, pertaining U.S. Appl. No. 16/036,260, 17 pages.

Notice of Allowance dated Feb. 20, 2020, pertaining U.S. Appl. No. 16/036,283, 18 pages.

Notice of Allowance dated Feb. 20, 2020, pertaining U.S. Appl. No. 16/036,319, 18 pages.

Baric, John, "Next-Level Hydrocracker Flexibility: Unlocking High Performance in Today's Turbulent Markets", Shell Global Solutions, 2016, 3-18.

Ding et al., "LCO Hydrotreating with Mo—Ni and W—Ni Supported on Nano- and Micro-Sized Zeolite Beta", Applied Catalysis A: General, 2009, 353 17-23.

Garcia-Martinez et al., "Mesostructured Zeolite Y-High Hydrothermal Stability and Superior FCC Catalytic Performance", Catal. Sci. Technol., 2012, 2, 987-994.

International Search Report and Written Opinion pertaining to PCT/US2017/026498 dated Jun. 30, 2017.

International Search Report and Written Opinion pertaining to PCT/US2017/035202 dated Aug. 7, 2017.

International Search Report and Written Opinion pertaining to PCT/US2017/048130 dated Oct. 18, 2017.

(56) References Cited

OTHER PUBLICATIONS

Liu et al., "Y/MCM-41 Composites Assembled from Nanocrystals", Microporous and Mesoporous Materials, 2013, 181, 116-122.
Varoshiotis, Andy, "Cyprus New Energy Economy Focus Should be in the Petrochemicals", 2015, Linkedin.
Zhang et al., "Preparation and Characterization of Beta/MCM-41 Composite Zeolite with a Stepwise-Distributed Pore Structure", Powder Technology, 2008, 73-78.
Office Action pertaining to U.S. Appl. No. 15/683,071 dated Sep. 6, 2018.
International Search Report and Written Opinion pertaining to PCT/US2018/028592 dated Jun. 27, 2018.
Penrose et al., "Enhancing Refinery Profitability by Gasification, Hydroprocessing & Power Generation", Gasification Technologies Conference, Oct. 1, 1999, San Francisco, CA, Texaco Power & Gasification.
International Search Report and Written Opinion pertaining to PCT/US2018/042016 dated Oct. 8, 2018.
Rana et al., "A Review of Recent Advances on Process Technologies for Upgrading of Heavy Oils and Residua", Fuel, 2007, 86, 1216-1231.
International Search Report and Written Opinion pertaining to PCT/US2018/042020 dated Oct. 8, 2018.
International Search Report and Written Opinion pertaining to International Application No. PCT/US2018/042011 dated Jan. 2, 2019, 20 pages.
International Search Report and Written Opinion pertaining to International Application No. PCT/US2018/042015 dated Jan. 2, 2019, 20 pages.
U.S. Office Action dated Mar. 12, 2019 pertaining to U.S. Appl. No. 15/480,917, filed Apr. 6, 2017, 46 pgs.
U.S. Office Action dated Apr. 2, 2019 pertaining to U.S. Appl. No. 15/605,575, filed May 25, 2017, 52 pgs.
Examination Report, dated Mar. 12, 2019 pertaining to GCC Patent Application No. 2017/33869, filed Aug. 23, 2017, 4 pages.
U.S. Office Action dated Jun. 27, 2019 pertaining to U.S. Appl. No. 15/944,068, filed Apr. 3, 2018, 50 pgs.
Examination Report dated Apr. 15, 2019 pertaining to GCC Patent Application No. 2017/33195, filed Apr. 11, 2017, 5 pages.
Examination Report dated Apr. 2, 2019 pertaining to GCC Patent Application No. 2017/33492, filed Jun. 1, 2017, 5 pages.
Office Action dated Sep. 17, 2019 pertaining to U.S. Appl. No. 16/036,319, filed Jul. 16, 2018, 49 pgs.
Office Action dated Sep. 13, 2019 pertaining to U.S. Appl. No. 16/036,283, filed Jul. 16, 2018, 50 pgs.
Office Action dated Sep. 12, 2019 pertaining to U.S. Appl. No. 16/036,260, filed Jul. 16, 2018, 48 pgs.
Office Action dated Jul. 30, 2019 pertaining to U.S. Appl. No. 15/480,917, filed Apr. 6, 2017, 30 pgs.
Office Action dated Nov. 7, 2019 pertaining to U.S. Appl. No. 15/605,575, filed May 25, 2017, 39 pgs.
Notice of Allowance and Fee(s) Due dated Jan. 13, 2020 pertaining to U.S. Appl. No. 15/944,068, filed Apr. 3, 2018, 8 pgs.
Notice of Allowance and Fee(s) Due dated Nov. 20, 2019 pertaining to U.S. Appl. No. 15/480,917, filed Apr. 6, 2017, 13 pgs.
Examination Report pertaining to Application No. GC2018-35195 dated Nov. 26, 2019.
Office Action dated Jun. 25, 2020 pertaining to U.S. Appl. No. 15/605,575, filed May 25, 2017, 35 pgs.
European Official Action dated Jul. 20, 2020 pertaining to European Patent Application No. 17719100.4, 5 pgs.
Office Action dated Oct. 1, 2020 pertaining to U.S. Appl. No. 16/036,304, filed Jul. 16, 2018, 83 pgs.
European Official Action dated Aug. 27, 2020 pertaining to European Patent Application No. 17761417.9, 5 pages.

\* cited by examiner

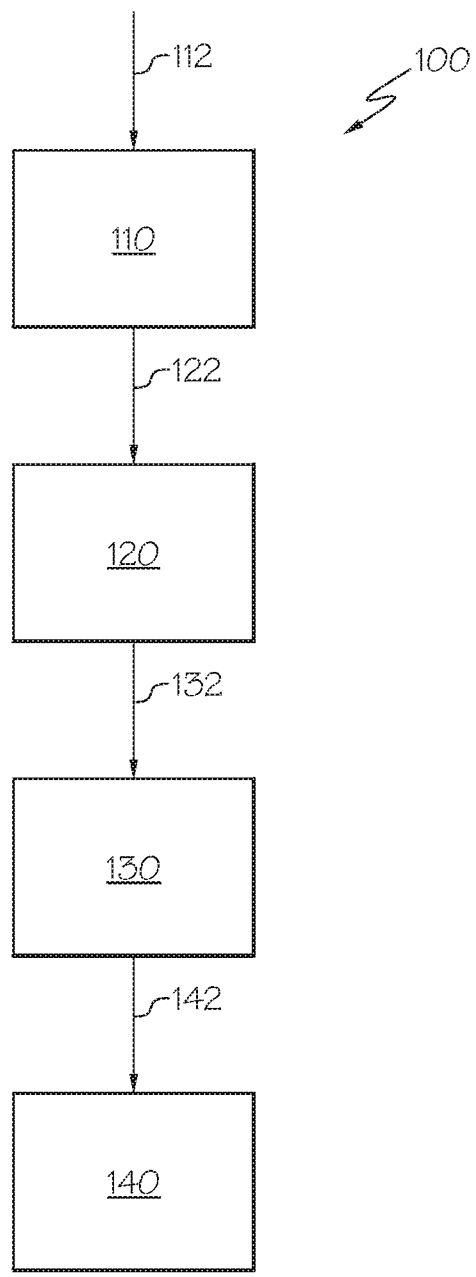

NANO-SIZED ZEOLITE SUPPORTED CATALYSTS AND METHODS FOR THEIR PRODUCTION

CROSS-REFERENCE TO RELATED APPLICATIONS

This application is a divisional application of and claims priority to U.S. patent application Ser. No. 15/480,917, filed on Apr. 6, 2017, now U.S. Pat. No. 10,603,657, which claims priority to U.S. Provisional Application Ser. No. 62/320,938, filed Apr. 11, 2016, all of which are incorporated by reference.

BACKGROUND

Field

The present disclosure relates to catalysts for chemical conversion of petrochemical fuels. More specifically, the disclosure relates methods for preparing catalysts which may be utilized in hydroprocessing treatments.

Technical Background

Hydrocracking is a versatile catalytic process that converts heavy oils to lighter products by aromatic saturation, cracking, and isomerization reactions in the presence of hydrogen. These hydrocracking treatments require hydrocracking catalysts which can at least partially crack the large molecules present in the heavy oils. For example, naphthenes and polyaromatics may be partially converted in a hydrocracking process. Most hydrocracking catalysts utilize a zeolite as support material. However, there are limitations in heavy oil conversion and stability of these catalysts. For example, conventional hydrocracking catalysts may have poor polyaromatic cracking conversion. Additionally, fabrication of such catalysts may be expensive and time consuming.

BRIEF SUMMARY

Zeolites may be used as a cracking component of hydrocracking catalysts. According to embodiments presently described, reduction in particle sizes of the zeolites can effectively reduce or even eliminate the diffusion limitations of heavy oil molecules into a zeolite, and thus increase the catalyst activity and selectivity. However, nano-sized particles are difficult to wash and separate, which results in high costs for separation and a decrease in zeolite yield. In addition, nano-sized particles easily become aggregated during calcination and hydrothermal treatment processes. The catalysts and methods for their preparation presently described do not require the separation of nano-sized zeolites from a synthesized colloidal mixture. Therefore, costs and time required for separation are avoided.

In accordance with one embodiment of the present disclosure, a zeolite supported catalyst may be synthesized by a process comprising combining a colloidal mixture with a metal oxide support material to form a support precursor material, processing the support precursor material to form a support material, and impregnating the support material with one or more metals to form the zeolite supported catalyst. The colloidal mixture may comprise nano-sized zeolite crystals, and the nano-sized zeolite crystals may have an average size of less than 100 nm.

In accordance with another embodiment of the present disclosure, a zeolite supported catalyst may be synthesized by a process comprising providing a colloidal mixture comprising nano-sized zeolite crystals, combining the colloidal mixture comprising nano-sized zeolite crystals with a alumina oxide to form a support precursor material, processing the support precursor material to form a support material, and impregnating the support material with one or more metals to form the zeolite supported catalyst. The nano-sized zeolite crystals may have an average size of less than 100 nanometers (nm).

In accordance with another embodiment of the present disclosure, a zeolite supported catalyst may comprise from 20 weight percent (wt. %) to 75 wt. % of porous alumina, from 20 wt. % to 30 wt. % of metal catalyst material, and from 5 wt. % to 50 wt. % of nano-sized zeolite. The nano-sized zeolite may have an average size of less than 100 nm. The zeolite supported catalyst may have a surface area of at least 180 square meters per gram ($m^2/g$).

In accordance with yet another embodiment of the present disclosure, a zeolite supported catalyst may be synthesized by a process comprising providing a colloidal mixture comprising nano-sized zeolite crystals, combining the colloidal mixture comprising nano-sized zeolite crystals with a metal oxide support material to form a support precursor material, processing the support precursor material to form a support material, and impregnating the support material with one or more metals to form the zeolite supported catalyst. The step of processing the support precursor may comprise drying the support precursor material to form an extrudable material, shaping the support precursor material, and hydrothermally treating the support precursor material. The nano-sized zeolite crystals may have an average size of less than 100 nm.

Additional features and advantages of the technology described in this disclosure will be set forth in the detailed description which follows, and in part will be readily apparent to those skilled in the art from the description or recognized by practicing the technology as described in this disclosure, including the detailed description which follows, the claims, as well as the appended drawing.

BRIEF DESCRIPTION OF THE DRAWINGS

The following detailed description of specific embodiments of the present disclosure can be best understood when read in conjunction with the following drawing, where like structure is indicated with like reference numerals and in which:

FIG. 1 is a generalized flow diagram of a method for synthesizing zeolite supported catalysts, according to one or more embodiments described in this disclosure.

DETAILED DESCRIPTION

The present disclosure describes a process where a nano-sized zeolite supported catalyst is synthesized. In one or more embodiments, the nano-sized zeolite supported catalyst includes nano-sized zeolite crystals. The synthesis methods presently described may eliminate process steps required in the production of conventional nano-sized zeolite supported catalysts which include nano-sized zeolites, such as separation of nano-scale zeolites from a colloidal mixture. As used in this disclosure, a conventional nano-sized zeolite catalyst refers to a catalyst which includes nano-sized zeolites and is prepared from dried, particulate nano-sized zeolites which are incorporated into the catalyst.

The methods described in the present disclosure do not require the separation of nano-sized zeolites into a solid, dry particulate form. In addition, the presently described embodiments of nano-sized zeolite supported catalysts may have improved physical properties, such as increased surface area, pore volume, and pore size. One or more of these improved physical properties may cause enhanced catalytic activity by the nano-sized zeolite supported catalyst.

As used in this disclosure, "nano-sized zeolites" refer to zeolite particles which have a size, as measured by their longest dimension, of less than 100 nm. In some embodiments, the zeolite particles (that is, the nano-sized zeolite) are present as a single crystal structure. The nano-sized zeolites described in this disclosure may have a size of from 1 nm to 100 nm, such as from 30 nm to 100 nm. The "average size" of a zeolite refers to the averaged value of the size of all particles of zeolite in a given nano-sized zeolite supported catalyst. It should be appreciated that a variety of zeolite structures are contemplated for use in the described catalysts. For example, the nano-sized zeolites incorporated into the catalysts described may be zeolite A, beta, mordenite, Y, or ZSM-5 type zeolites.

Referring now to FIG. 1, a process flow diagram for a method of synthesizing a nano-sized zeolite supported catalyst is depicted. According to one or more embodiments, the described nano-sized zeolite supported catalysts may be synthesized by a method 100 comprising at least step 112 of providing a colloidal mixture comprising nano-sized zeolite crystals 110, step 122 of combining the colloidal mixture comprising nano-sized zeolite crystals with a metal oxide support material to form a support precursor material 120, step 132 of processing the support precursor material to form a support material 130, and step 142 of impregnating the support material with one or more metals to form the nano-sized zeolite supported catalyst 140.

In one embodiment, the synthesis process may begin by the step of providing a colloidal mixture comprising nano-sized zeolite crystals. The step of providing the colloidal mixture comprising nano-sized zeolite crystals may include processes such as, but not limited to, fabricating the nano-sized zeolite crystals in a colloidal mixture or directly acquiring such a colloidal mixture comprising nano-sized zeolite crystals. It should be understood that numerous methods may be available for fabricating a colloidal mixture containing nano-sized zeolite crystals, and that methods not explicitly described for fabricating a colloidal mixture containing nano-sized zeolite crystals are contemplated in this disclosure. As used in this disclosure, a "colloidal mixture" refers to a mixture of at least two materials where the mixture has a state of subdivision such that the molecules or polymolecular particles dispersed in a medium have at least one dimension between approximately 1 nm and 1 micron (μm).

According to one embodiment for providing the colloidal mixture comprising nano-sized zeolite crystals, the colloidal mixture comprising nano-sized zeolite crystals may be produced by providing a mixture containing at least a quaternary ammonium salt, silica, alumina, and water, and autoclaving the mixture containing at least the quaternary ammonium salt, silica, aluminum, and water to form nano-sized zeolite crystals in a colloidal mixture. In one embodiment, the quaternary ammonium salt may be tetramethylammonium hydroxide (TEAOH). According to one or more embodiments, the mixture containing at least a quaternary ammonium salt, silica, alumina, and water may have a molar ratio of these contents of 1 mole of alumina, from 6 moles to 120 moles of quaternary ammonium salt (such as from 20 moles to 50 moles, or from 22 moles to 36 moles), from 15 moles to 200 moles of silica (such as from 30 moles to 80 moles, or from 40 moles to 60 moles), and from 250 moles to 1000 moles of water (such as from 400 moles to 850 moles, or from 500 moles to 750 moles). The molar ratio of the quaternary ammonium salt to silica may be from 0.4 to 0.6. According to one embodiment, the mixture containing at least the quaternary ammonium salt, silica, alumina, and water, as described previously in this disclosure, may be autoclaved for 2 to 4 days at 40 rotations per minute (rpm) to 80 rpm (such as 60 rpm) at 100 degrees Celsius (° C.) to 180° C. (such as from 130° C. to 150° C., or 140° C.) to form the nano-sized zeolite crystals. Prior to autoclaving, the mixture containing at least a quaternary ammonium salt, silica, alumina, and water may be stirred, such as for 4 hours at room temperature. It should be understood that the described autoclaving and stirring steps may be modified to some degree depending upon the exact components of the mixture that is autoclaved and the desired zeolite crystal to be formed.

Following the step of providing the colloidal mixture comprising nano-sized zeolite crystals 110, the colloidal mixture comprising nano-sized zeolite crystals may be combined with a metal oxide support material, such as alumina, to form a support precursor material. In one or more embodiments, the metal oxide support material that is combined with the colloidal mixture comprising nano-sized zeolites comprises two different pore sizes. For example, some of the metal oxide support material may have a pore size of from 0.4 milliliters per gram (mL/g) to 0.6 mL/g (such as from 0.45 mL/g to 0.55 mL/g) and some of the metal oxide support material may have a pore size of from 0.8 mL/g to 1.2 mL/g (such as from 0.85 mL/g to 1.1 mL/g). The metal oxide support material having the small pore size (that is, from 0.4 mL/g to 0.6 mL/g) may be referred to in this disclosure as "small pore size metal oxide" and the metal oxide support material having the large pore size (that is, from 0.8 mL/g to 1.2 mL/g) may be referred to in this disclosure as "large pore size metal oxide."

The metal oxide support material that is combined with the colloidal mixture comprising nano-sized zeolites may include a single metal oxide chemical species, or may be a combination of two or more metal oxide chemical species. In one or more embodiments, at least a portion of the metal oxide is alumina, or the metal oxide support material consists of alumina.

In addition to the metal oxide support material, nitric acid (that is, $HNO_3$) may be combined with the colloidal mixture comprising nano-sized zeolites such that the support precursor material further comprises $HNO_3$. Without being bound by theory, it is believed that the addition of $HNO_3$ may peptize the metal oxide support material, such as alumina, which functions as a binder in the support precursor material, adding increased physical integrity to the zeolite supported catalysts presently described. The $HNO_3$ may decompose during calcination. Additional acids, such as hydrochloric acid (HCl) may be incorporated into the catalyst following calcination. However, chlorine (Cl) from the HCl may be present in the catalyst if HCl is incorporated, which may cause faster deactivation of the catalyst. Therefore, some embodiments may utilize $HNO_3$ as an exemplary acid because of its binding functionality while not substantially reducing catalytic durability.

According to one embodiment, the small pore size metal oxide may be combined with the colloidal mixture comprising nano-sized zeolites before the large pore size metal oxide is combined with the colloidal mixture comprising nano-sized zeolites. For example, in one embodiment, the small pore size metal oxide, the large pore size metal oxide, or both, may be mixed with $HNO_3$ and then combined with the colloidal mixture comprising nano-sized zeolite crystals to from the support precursor material.

It should be understood that, unlike in the fabrication of some conventional nano-size zeolite catalysts, in the presently disclosed embodiments, the material of the support (for example, a metal oxide such as porous alumina) is combined with the zeolite while the zeolite is in a colloidal system. By comparison, conventional nano-size zeolite catalysts may be produced by a process where the nano-size zeolite is separated from the colloidal mixture, such as by centrifugation, and made into particulate form. The separated nano-size zeolite particles must then be dried by applying heat. Without the need for a separation step, the presently described synthesis methods have several advantages. For example, the yield of nano-size zeolite may be increased and time may be saved by not utilizing a separation step. Additionally, environmental and health concerns may be avoided, which may be present when nano-sized powders are separated out of the colloidal mixture. Additionally, in some embodiments, added steps such as ion-exchange and multiple washing steps of the nano-size zeolite particles can be avoided.

Following the step of combining the colloidal mixture comprising nano-sized zeolite crystals with a metal oxides support material to form a support precursor material, the support precursor material may be processed to form a support material. Processing of the support precursor material may include one or more of drying the support precursor material to form an extrudable material, shaping the support precursor material, and hydrothermally treating the support precursor material. In some embodiments, the support precursor material may be sequentially dried to form an extrudable material, shaped, and then hydrothermally treated. The drying of the support precursor material may include heating of the support precursor material, and the resulting dry, extrudable support precursor material may have a dough-like consistency and may have properties of a non-Newtonian fluid. The time and temperature of heating may depend on the amount of moisture in the support precursor material, but should be sufficient to remove enough moisture for the support precursor material to be extrudable. The support precursor material may then be extruded into three-dimensional shapes such as, without limitation, spheres, pellets, cylinders, trilobe, and quadralobe shaped pieces, and other suitable geometric shapes are contemplated. Following the shaping, the support precursor material may be hydrothermally treated at an elevated temperature for an extended period of time. In one embodiment, the hydrothermal treatment may include exposing the support precursor material to a temperature of from 450° C. to 600° C. for 0.5 hours to 3 hours at a pressure of from 2 bar to 4 bar. The hydrothermal treatment may produce self-generated steam from water contained in the support precursor material. In an alternative embodiment, additional moisture may be applied during the hydrothermal treatment.

Following the step of processing the support precursor material to form a support material, the support material may be impregnated with one or more metals to form the nano-sized zeolite supported catalyst. According to described embodiments, the impregnation of the support material may comprise contacting the support material with a solution comprising one or more metal catalyst precursors. For example, the support material may be submerged in the solution comprising the one or more metal catalyst precursors, an impregnation method sometimes referred to as a saturated impregnation. In embodiments of saturated impregnation, the support may be submerged in an amount of solution comprising the metal catalyst precursors 2 to 4 times of that which is absorbed by the support, and the remaining solution is subsequently removed. According to another embodiment, the impregnation may be by incipient wetness impregnation, sometimes referred to as capillary impregnation or dry impregnation. In embodiments of incipient wetness impregnation, the metal catalyst precursor containing solution is contacted with the support, where the amount of solution is approximately equal to the pore volume of the support and capillary action may draw the solution into the pores. After the contacting of the support material with the solution, the support material may be calcined at a temperature of at least 500° C. (such as from 500° C. to 600° C.) for a time of at least 3 hours (such as 3 hours to 6 hours). For example, the calcining may be at a temperature of 500° C. for 4 hours. Generally, the impregnation process will allow for attachment of the metal catalyst onto the support materials (that is, the zeolite and metal oxide support). The metal catalyst precursors may include one or more of Ni, W, Mo, Co, and following the impregnation, are present on the catalyst support as compounds comprising Ni, W, Mo, Co, or combinations thereof. Two or more metal catalyst precursors may be utilized when two metal catalysts are desired. However, some embodiments may include only one of Ni, W, Mo, or Co. For example, the catalyst support material may be impregnated by a mixture of nickel nitrate hexahydrate (that is, $Ni(NO_3)2.6H_2O$) and ammonium metatungstate (that is, $(NH_4)6H_2W_{12}O_{40}$) if a W—Ni catalyst is desired. While it should be understood that the scope of the present disclosure should not be limited by the metal catalyst precursor selected, other suitable metal catalyst precursors may include cobalt nitrate hexahydrate $(Co(NO_3)_2.6H_2O)$, ammonia heptamolybdate $((NH_4)6Mo_7O_{24}.4H_2O)$, or ammonium molybdate $((NH_4)2MoO_4)$. Following impregnation, the impregnated metal catalysts may be present as a metal oxide, such as $WO_3$, $MoO_3$, NiO, and CoO, and are referred to in this disclosure as "metal catalyst materials." While these metal catalyst materials may include metal oxides, it should be appreciated that the metal catalyst materials are distinct from the metal oxide support material of the catalyst which may, in some embodiments, be porous alumina.

The nano-sized zeolite supported catalysts described in this disclosure may have a material composition comprising from 20 wt. % to 90 wt. % of one or more metal oxide support materials (that is, for example, the porous support material such as porous alumina), from 20 wt. % to 30 wt. % of metal catalyst material, and from 5 wt. % to 50 wt. % of zeolite. As described previously in this disclosure, the one or more metal oxide support materials may consist of porous alumina. According to one or more embodiments, the presently described catalyst may comprise a compositional amount of large pore size alumina of from 10 wt. % to 65 wt. % and a compositional amount of small pore size alumina of from 15 wt. % to 25 wt. %. Also, as described previously in this disclosure, the metal catalyst material may comprise one or more of $WO_3$, $MoO_3$, NiO, and CoO. According to one or more embodiments, the presently described catalyst may comprise one or more of a compositional amount of $MoO_3$ of from 13 wt. % to 18 wt. %, a compositional amount of $WO_3$ of from 20 wt. % to 25 wt. %, or a combined compositional amount of NiO and CoO of from 3 wt. % to 8 wt. %. Generally, the catalyst support material is formed from the nano-sized zeolites disposed on and in the porous metal oxide support, and the metal catalyst material is positioned on the support.

The nano-sized zeolite supported catalysts described, such as those synthesized by the methods described previously in this disclosure, may have one or more of a greater surface area, greater pore volume, or greater pore size as compared with a conventionally prepared nano-sized zeolite supported catalyst. According to an embodiment, the present nano-sized zeolite supported catalyst may have a surface area of at least 180 m$^2$/g (such as at least 190 m$^2$/g, at least 200 m$^2$/g, at least 210 m$^2$/g, or even at least 220 m$^2$/g). According to another embodiment, the presently described nano-sized zeolite supported catalyst may have a pore volume of at least 0.45 mL/g (such as at least 0.5 mL/g, or even at least 0.55 mL/g). According to another embodiment, the presently described nano-sized zeolite supported catalyst may have a pore size of at least 9.5 nm (such as at least 9.7 nm, at least 9.9 nm, or even at least 10.1 nm). As used in this disclosure, "pore size" refers to the average pore size, and "pore volume" refers to the total pore volume measured.

According to another embodiment of the present disclosure, the nano-sized zeolite supported catalysts may be used as catalysts for hydrocracking reactions, as well as other hydroprocessing reactions. Hydrocracking reactions may be utilized to crack a hydrocarbon feed or fraction, and may be incorporated into a hydroprocessing treatment. Example feedstocks that may be processed by the catalysts presently described include vacuum gas oil, deasphalted gas oil, and light cycled oil. Typically, hydroprocessing units may utilize hydrotreating reactions and a bottom bed hydrocracking reaction. In hydrotreating reactions, the major reactions may be sulfur, nitrogen, and metal removal (sometimes referred to as hydrodesulfurization (HDS), hydrodenitrogenation (HDN), and hydrodemetallization (HDM), respectively). The described catalysts may have one or more of HDS, HDN, or HDM functionality, in addition to hydrocracking functionality. In the hydrocracking reaction, the major reaction is the conversion of the large hydrocarbons to small hydrocarbons (that is, cracking). Hydrotreating may be used for upgrading petroleum fractions, where the cracking and conversion of the hydrocarbons of the petroleum fraction are generally lower than 10 wt. %. It should be understood that the nano-sized zeolite supported catalysts presently described may be operable as catalysts for other functions that hydrocracking, and should not be limited to a particular use, such as a hydrocracking catalyst in a hydroprocessing unit as described.

EXAMPLES

The various embodiments of methods for producing nano-sized zeolite supported catalysts will be further clarified by the following examples. The examples are illustrative in nature, and should not be understood to limit the subject matter of the present disclosure.

Example 1—Synthesis of Presently Disclosed Catalyst

To form nano-sized zeolites, a fumed silica (AEROSIL® 200, available from Evonic Industries), aluminum powder, and tetraethylammonium hydroxide (TEAOH) (35 wt. % aqueous solution, available from Aldrich) were used as silica source, aluminum source, and template agent, respectively. The precursor gels had the oxide molar compositional ratio of 30TEAOH:50SiO$_2$:Al$_2$O$_3$:750H$_2$O. The metal aluminum was dissolved in the part of TEAOH-containing aqueous solution to form a clear solution, and then added to the slurry made by fumed silica and the other part of the TEAOH-containing aqueous solution. The formed aluminosilicate fluid gel was stirred in a beaker at ambient temperature for 4 hours, and then transferred into a 125 milliliters (mL) polytetrafluoro ethylene (PTFE) lined stainless steel autoclave. The crystallization was carried out at 413 Kelvin (K), either under the static state in an oven or under the rotational state at 60 rpm in an oil bath. The autoclave was quenched to stop the crystallization process after various periods of time of crystallization.

Small pore size alumina (pore size 0.4-0.6 mL/g) was mixed with diluted HNO$_3$, and then large pore size alumina (pore size 0.8-1.2 mL/g) was added to the mixture of small pore size alumina and HNO$_3$. Then, the nano-sized zeolite slurry formed from the autoclave which contained the nano-sized zeolite crystals was added to the mixture of small and large pore size alumina. Some water was removed from the mixture by heating until a dough consistency was formed. This dough-like material was then extruded and hydrothermally treated under 1 bar self-generated steam at 550° C. for 1 hour. The hydrothermally treated, extruded support material was then impregnated with an aqueous solution of the appropriate amount of nickel nitrate hexahydrate [Ni(NO$_3$)$_2$.6H$_2$O] and ammonium metatungstate [(NH$_4$)$_6$H$_2$W$_{12}$O$_{40}$] to form a catalyst having 22-26 wt. % WO$_3$ and 3-6 wt. % NiO. The impregnated support material was then dried at 383 K overnight, and then calcinated at 773 K for 4 hours.

Example 2—Synthesis of Conventional Catalyst

A conventional nano-sized zeolite catalyst was prepared by the process as follows. A fumed silica (AEROSIL® 200, available from Evonic Industries), aluminum powder, and TEAOH (35 wt. % aqueous solution, available from Aldrich) were used as silica source, aluminum source, and template agent, respectively. The precursor gels had the oxide molar compositions 30TEAOH:50SiO$_2$:Al$_2$O$_3$:750H$_2$O. The metal aluminum was dissolved in the part of TEAOH-containing aqueous solution to form a clear solution, and then added to the slurry made by fumed silica and the other part of the TEAOH-containing aqueous solution. The formed aluminosilicate fluid gel was stirred in a beaker at ambient temperature for 4 h, and then transferred into a 125 mL PTFE lined stainless steel autoclave. The crystallization was carried out at 413 K, either under the static state in an oven or under the rotational state (60 rpm) in an oil bath. The autoclave was quenched to stop the crystallization process after various periods of time of crystallization. The final product was separated from the liquid using a 16,000 rpm centrifuge, washed with deionized water several times until pH<9.0, and dried at 383 K in an oven.

The dried zeolite powder samples were treated under 0.1 megapascal (MPa) "self-steam" pressure in an autoclave at 823 K for 1 hour. The above hydrothermally treated zeolite beta was mixed with large-pore alumina (Sasol PURALOX® TH100/150, pore volume 0.96 mL/g, specific surface area 201.6 m$^2$/g), and binder (partially acid-peptized alumina, Sasol, CATAPAL® B), extruded to form cylindrically shaped extrudate, dried at 383 K overnight, and then calcined in air at 823 K for 4 hours to form the supports. The WNi catalysts were prepared by co-impregnation of the above supports using the incipient wetness method with an aqueous solution of the appropriate amounts of nickel nitrate hexahydrate (that is, Ni(NO$_3$)$_2$6H$_2$O) and ammonium metatungstate (that is, $(NH_4)6H_2W_{12}O_{40}$), dried at 383 K overnight, and calcined at 773 K for 4 hours.

Example 3—Analysis of Catalysts of Example 1 and Example 2

Various properties of the catalyst of Example 1 and Example 2, including surface area, pore volume, and pore size, were measured and are shown in Table 1.

TABLE 1

| Catalyst | Catalyst of Example 1 | Catalyst of Example 2 (Conventional) |
|---|---|---|
| Surface area, m²/g | 220 | 179 |
| Pore volume, mL/g | 0.56 | 0.42 |
| Pore size, nm | 10.2 | 9.4 |

Additionally, the presently described catalyst of Example 1 and the conventional catalyst of Example 2 were tested for catalytic activity. The catalyst activity evaluation was carried out in a 1 liter (L) stirred autoclave reactor (Autoclave Engineers Division of Snap-tite, Inc. EZE-SEAL® stirred reactor). Light cycle oil (LCO) was utilized as the reactant, and the properties of the LCO are listed in Table 2. Then, 20 grams (g) of the catalyst were loaded in the catalyst basket in the reactor. The reactor was repeatedly evacuated and refilled with hydrogen to replace the air in the autoclave. Thereafter, 5 mL of sulfiding agent, dimethyl disulfide (DMDS), was added to the reactor. The theoretical calculation and experimental results on DMDS decomposition demonstrated that 5 mL of DMDS was sufficient to sulfide 20 g of catalyst. Prior to heating the reactor, the reactor was pressurized to 3.4 MPa. The catalyst was sulfided in situ at 593 K for 2 hours and at 633 K for another 2 hours. After the sulfidation, LCO was charged into the batch autoclave reactor through a feed charging tank mounted on the top of the reactor. The reactor was pressurized to 4.8 MPa, and temperature was increased to 648 K at a rate of 3 Kelvin per minute (K/min) under 1000 rpm stirring. When the temperature reached the set temperature (648 K), the hydrogen pressure was adjusted to 6.8 MPa and maintained for 2 hours under stirring. After reaction, the liquid product was collected and analyzed. The nitrogen, sulfur, and aromatics were analyzed in terms of ASTM D4629, ASTM D4294, and ASTM D6591, respectively. The boiling ranges of LCO and liquid products were measured with simulated distillation by gas chromatography. The HDS, HDN, and HDA activities of the catalysts were determined by the equation:

$$\text{Activity} = \frac{xF - xP}{xF} \times 100\%$$

where xF and xP stand for the sulfur, nitrogen, and saturate (from hydrocarbon composition analysis) contents in feed and product, respectively. The results of the catalytic activity test for the catalysts of Example 1 and Example 2 are shown in Table 3.

TABLE 2

| Density (g/mL at 25° C.) | 0.9600 |
|---|---|
| Nitrogen (parts per million by weight) | 510 |
| Sulfur (wt. %) | 1.6 |

TABLE 2-continued

| Hydrocarbon composition (wt. %) | |
|---|---|
| Saturates | 11.4 |
| Monoaromatics | 20.0 |
| Diaromatics | 48.3 |
| Polyaromatics | 20.3 |
| Distillation (° C.) | |
| Initial Boiling Point (IBP) | 141 |
| 10 wt. % | 220 |
| 20 wt. % | 242 |
| 30 wt. % | 261 |
| 40 wt. % | 282 |
| 50 wt. % | 290 |
| 60 wt. % | 308 |
| 70 wt. % | 325 |
| 80 wt. % | 345 |
| 90 wt. % | 369 |
| Final Boiling Point (FBP) | 388 |

TABLE 3

| | Conventional Catalyst of Example 2 | Catalyst of Example 1 |
|---|---|---|
| Density (g/mL at 15.6° C.) | 0.9129 | 0.9087 |
| Total nitrogen (parts per million by weight) | 40.2 | 1.51 |
| Total sulfur (parts per million by weight) | 893.4 | 665.9 |
| Hydrocarbon Distribution (wt. %) | | |
| Saturates | 21.7 | 27.6 |
| Monoaromatics | 46.5 | 46.3 |
| Diaromatics | 25.6 | 20.2 |
| Polyaromatics | 6.2 | 5.9 |
| HDN (%) | 92.1 | 99.7 |
| HDS (%) | 94.4 | 95.8 |
| HDA (%) | 11.6 | 18.3 |

As compared with the conventional catalyst of Example 2, the catalyst of Example 1 had increased HDN, HDS, and HDA activity. Both diaromatic and polyaromatic content was reduced as compared with the conventional catalyst.

It is noted that one or more of the following claims utilize the term "where" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

It should be understood that any two quantitative values assigned to a property may constitute a range of that property, and all combinations of ranges formed from all stated quantitative values of a given property are contemplated in this disclosure. Additionally, it should be understood that specific heating temperatures and times involved in producing the disclosed catalysts may vary based on the specific components of the catalyst, and should not be limiting on the disclosed methods for producing the presently described catalysts.

Having described the subject matter of the present disclosure in detail and by reference to specific embodiments, it is noted that the various details described in this disclosure should not be taken to imply that these details relate to elements that are essential components of the various embodiments described in this disclosure, even in cases where a particular element is illustrated in each of the drawings that accompany the present description. Rather, the claims appended hereto should be taken as the sole representation of the breadth of the present disclosure and the corresponding scope of the various embodiments described in this disclosure. Further, it will be apparent that modifications and variations are possible without departing from the scope of the appended claims.

The invention claimed is:

1. A zeolite supported catalyst suitable for hydrocracking reactions, the zeolite supported catalyst comprising:
   from 20 wt. % to 75 wt. % of porous alumina;
   from 20 wt. % to 30 wt. % of metal catalyst material comprising $WO_3$; and
   from 5 wt. % to 50 wt. % of nano-sized zeolite; where:
      the nano-sized zeolite has an average size of less than 100 nm; and
      the zeolite supported catalyst has a surface area of at least 180 $m^2/g$.

2. The zeolite supported catalyst of claim 1, where the zeolite supported catalyst has a pore volume of at least 0.45 mL/g.

3. The zeolite supported catalyst of claim 1, where the zeolite supported catalyst has a pore size of at least 9.5 nm.

4. The zeolite supported catalyst of claim 1, where the metal catalyst material further comprises one or more of $MoO_3$, NiO, and CoO.

5. The zeolite supported catalyst of claim 1, where the porous alumina comprises:
   a small pore size alumina having a pore volume of from 0.4 mL/g to 0.6 mL/g; and
   a large pore size alumina having a pore volume of from 0.8 mL/g to 1.2 mL/g.

6. The zeolite supported catalyst of claim 5, comprising:
   from 15 wt. % to 25 wt. % of the small pore size alumina; and
   from 10 wt. % to 65 wt. % of the large pore size alumina.

7. The zeolite supported catalyst of claim 1, where the zeolite support catalyst has a surface area of at least 190 $m^2/g$.

8. The zeolite supported catalyst of claim 1, where the nano-sized zeolite is zeolite A, mordenite, zeolite Y, ZSM-5, or combinations of these.

\* \* \* \* \*